United States Patent
Lin et al.

(10) Patent No.: US 9,954,982 B2
(45) Date of Patent: Apr. 24, 2018

(54) TRANSMISSION APPARATUS AND TRANSMISSION METHOD THEREOF

(71) Applicant: REALTEK SEMICONDUCTOR CORP., Hsinchu (TW)

(72) Inventors: Chia-Hung Lin, New Taipei (TW); Chang-Shiuan Yang, Taichung (TW); Yi-Huei Lei, Kaohsiung (TW); Chun-Hao Lin, Taoyuan (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 202 days.

(21) Appl. No.: 15/154,171

(22) Filed: May 13, 2016

(65) Prior Publication Data

US 2017/0118314 A1 Apr. 27, 2017

(30) Foreign Application Priority Data

Oct. 21, 2015 (TW) .............................. 104134531 A

(51) Int. Cl.
 *H04L 9/12* (2006.01)
 *H04L 29/06* (2006.01)

(52) U.S. Cl.
 CPC .......... *H04L 69/22* (2013.01); *H04L 63/0428* (2013.01); *H04L 63/166* (2013.01); *H04L 69/16* (2013.01); *H04L 69/161* (2013.01)

(58) Field of Classification Search
 None
 See application file for complete search history.

(56) References Cited

U.S. PATENT DOCUMENTS

| 9,432,274 | B1 * | 8/2016 | Peon | H04L 47/34 |
| 9,544,153 | B1 * | 1/2017 | Roskind | H04L 63/0428 |
| 9,628,443 | B2 * | 4/2017 | Roskind | H04L 63/029 |
| 2017/0331874 | A1 * | 11/2017 | Racz | H04L 65/605 |

OTHER PUBLICATIONS

Hamilton et al. "QUIC: A UDP-Based Secure and Reliable Transport for HTTP/2 draft-tsvwg-quic-protocol-01", Internet-Draft, Jul. 8, 2015.*

* cited by examiner

*Primary Examiner* — Alex Skripnikov
(74) *Attorney, Agent, or Firm* — Li & Cai Intellectual Property (USA) Office

(57) ABSTRACT

A transmission apparatus for preprocessing a data packet stored in a system memory to generate at least one segment data packet is provided. The transmission apparatus includes a transmission engine and a data memory. The transmission engine includes a header buffer, a segment controller and an encrypt engine. The header buffer stores an IP header, a UDP header, a QUIC public header and a QUIC private header of the data packet. The segment controller divides a payload of the data packet into at least one segment payload. The encrypt engine encrypts the QUIC private header and the at least one segment payload into at least one encrypted data. The data memory receives the IP header, UDP header, QUIC public header and at least one encrypted data. The IP header, UDP header, QUIC public header and at least one encrypted data are combined into at least one segment data packet.

15 Claims, 4 Drawing Sheets

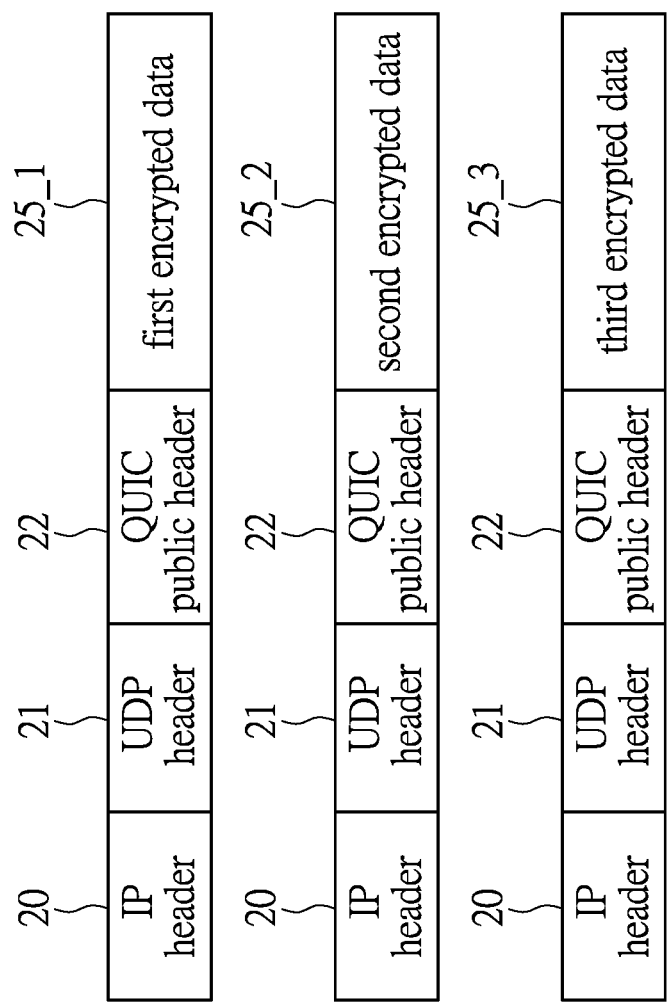

TRANSMISSION APPARATUS AND TRANSMISSION METHOD THEREOF

BACKGROUND

1. Technical Field

The present disclosure relates to a transmission apparatus, in particular, to a transmission apparatus supporting a QUIC (Quick UDP Internet Connection) protocol, and a transmission method thereof.

2. Description of Related Art

Currently, there have been several network protocols that support diverse service requirements. For example, the Transmission Control Protocol and the IP-Internet Protocol (TCP/IP) is the most common internet protocol configured to plan for how the data should be packaged, addressed, transmitted, routed, and received at the destination. In recent years, a QUIC protocol has been developed.

The QUIC protocol is a transport layer protocol with low latency and based on the UDP protocol. Compared with the TCP/IP protocol, the QUIC protocol has higher transmission efficiency. A communication device which supports the QUIC protocol first divides a data packet into a plurality of segment data packets, and sizes of the segment data packets are smaller than a max transmit unit specified in the QUIC protocol. Then, the communication device encrypts each segment data packet. After finishing encrypting the segment data packets, a transceiver of the communication apparatus individually reads the encrypted segment data packets and transmits the encrypted segment data packets to other communication apparatus.

The current communication device divides the data packet using a central processing unit (CPU) installed in the communication device. The central processing unit encrypts each segment data packet, which causes a utilization rate of the central processing unit to increase. Furthermore, the current communication device stores a header of the data packet in a system memory of itself, such that the system memory can not store other data.

SUMMARY

An exemplary embodiment of the present disclosure provides a transmission apparatus. The transmission apparatus is configured to preprocess a data packet stored in a system memory to generate at least one segment data packet. The transmission apparatus includes a transmission engine and a data memory. The transmission engine includes a header buffer, a segment controller and an encrypt engine. The header buffer is configured to store an IP header, a UDP header, a QUIC public header and a QUIC private header of the data packet. The segment controller is configured to divide a payload of the data packet into at least one segment payload. The encrypt engine is configured to encrypt the QUIC private header and the at least one segment payload into at least one encrypted data. The data memory receives the IP header, the UDP header, the QUIC public header and the at least one encrypted data, and combines the IP header, the UDP header, the QUIC public header and the at least one encrypted data into the at least one segment data packet.

An exemplary embodiment of the present disclosure provides a transmission method. The transmission method is adapted for a transmission apparatus. The transmission apparatus includes a transmission engine and a data memory, and the transmission engine includes a header buffer. The transmission method includes the following steps: obtaining a data packet; storing an IP header, a UDP header, a QUIC public header and a QUIC private header of the data packet in the header buffer; dividing a payload of the data packet into at least one segment payload; encrypting the QUIC private header and the at least one segment payload into at least one encrypted data; receiving the IP header, the UDP header, the QUIC public header and the at least one encrypted data by the data memory; and combining the IP header, the UDP header, the QUIC public header and the at least one encrypted data into at least one segment data packet.

An exemplary embodiment of the present disclosure provides a transmission apparatus. The transmission apparatus is configured to preprocess a data packet stored in a system memory to generate a plurality of segment data packets. The transmission apparatus includes a transmission engine and a data memory. The transmission engine includes a header buffer, a segment controller and an encrypt engine. The header buffer is configured to store an IP header, a UDP header, a QUIC public header and a QUIC private header of the data packet. The segment controller is configured to divide a payload of the data packet into a plurality of segment payloads. The encrypt engine is configured to encrypt the QUIC private header and the segment payloads into a plurality of encrypted data. The data memory is configured to receive the IP header, the UDP header, the QUIC public header and each of the encrypted data, wherein the IP header, the UDP header, the QUIC public header and the encrypted data are combined into the segment data packets.

To sum up, the transmission apparatus and the transmission method of the present disclosure can divide and encrypt the data packet to generate at least one segment data packet. Workload of the central processing unit of the communication apparatus is reduced by using the transmission apparatus of the present disclosure, and the utilization rate of the central processing unit is decreased.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 3B is a schematic diagram illustrating segment data packets according to an embodiment of the present disclosure.

DESCRIPTION OF THE EXEMPLARY EMBODIMENTS

Figure 1:
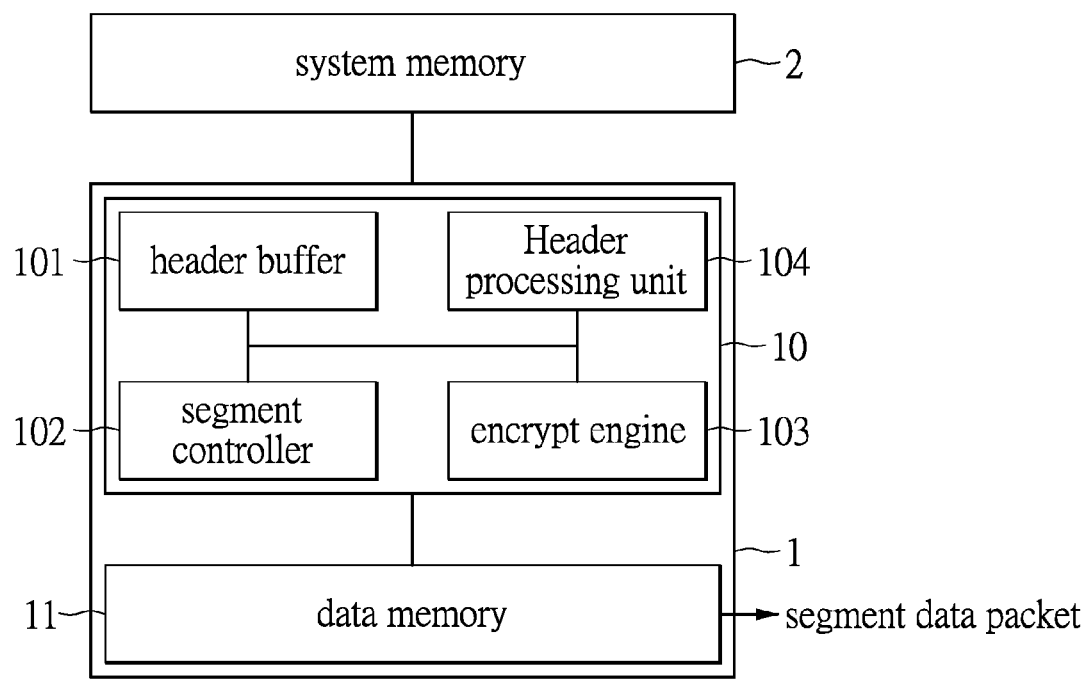
FIG. 1 is a block diagram illustrating a transmission apparatus according to an embodiment of the present disclosure.

Reference is made to FIG. 1. FIG. 1 is a block diagram illustrating a transmission apparatus according to an embodiment of the present disclosure. The transmission apparatus 1 includes a transmission engine 10 and a data memory 11. The transmission engine 10 includes a header buffer 101, a segment controller 102, an encrypt engine 103 and a header processing unit 104. The transmission engine 10 is coupled to the data memory 11, and the transmission engine 10 is further coupled to a system memory 2. The header buffer 101, the segment controller 102, the encrypt engine 103 and the header processing unit 104 are coupled to each other.

The transmission apparatus 1 can be installed in a general communication apparatus, e.g., a computer or a smart phone which can support a QUIC (Quick UDP Internet Connection) protocol. The transmission apparatus 1 is configured to preprocess a data packet stored in the system memory 2 to generate at least one segment data packet. The system memory 2, e.g., any kind of storage media, is configured to store at least one data packet of the communication apparatus, and outputs a storage location and a packet size of the data packet to the transmission engine 10.

Figure 2:
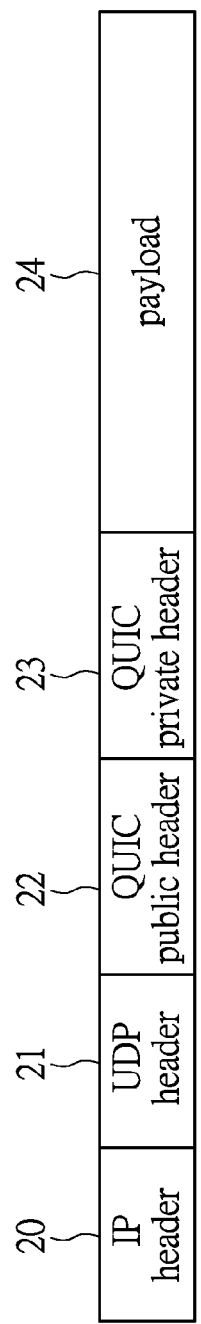
FIG. 2 is a schematic diagram illustrating a data packet according to an embodiment of the present disclosure.

Reference is also made to FIG. 2. FIG. 2 is a schematic diagram illustrating a data packet according to an embodiment of the present disclosure. The data packet includes an IP header 20, a UDP header 21, a QUIC public header 22, a QUIC private header 23 and a payload 24. The IP header 20, the UDP header 21, the QUIC public header 22 and the QUIC private header 23 respectively include information which is needed during a packet transmission process, e.g., the packet size, a source address, a destination address or a transport protocol. The payload 24 includes information which the communication device is about to transfer. The information included in the IP header 20, the UDP header 21, the QUIC public header 22, the QUIC private header 23 and the payload 24 is well known by those of ordinary skill in the art, thus details are not described herein.

In the embodiment, the data packet is sequentially composed of the IP header 20, the UDP header 21, the QUIC public header 22, the QUIC private header 23 and the payload 24. However, the present disclosure is not limited thereto. Those of ordinary skill in the art can design a structure of the data packet according to any practical situation.

Reference is made back to FIG. 1. The transmission engine 10 is configured to obtain the data packet from the system memory 2. Then, the transmission engine 10 divides and encrypts the data packet to generate at least one segment data packet.

The header buffer 101 comprises suitable logic, circuitry, interfaces and/or code operable to store the IP header 20, the UDP header 21, the QUIC public header 22 and the QUIC private header 23 of the data packet, and outputs the QUIC private header 23 to the encrypt engine 103.

In addition, during combining each segment data packet, the header buffer 101 further outputs the IP header 20, the UDP header 21 and the QUIC public header 22 to the data memory 11. Then at least one segment data packet is generated in the data memory 11 according to the IP header 20, the UDP header 21 and the QUIC public header 22.

The segment controller 102 comprises suitable logic, circuitry, interfaces and/or code operable to receive the payload 24, and divide the payload 24 into at least one segment payload based on a max transmit unit (MTU) recorded in a QUIC protocol. Next, the segment controller 102 outputs the segment payload to the encrypt engine 103.

The encrypt engine 103 comprises suitable logic, circuitry, interfaces and/or code operable to receive the QUIC private header 23 and the segment payload, and to encrypt the QUIC private header 23 and at least one segment payload into at least one encrypted data based on an encryption standard. For example, the encrypt engine 103 encrypts the QUIC private header 23 and each segment payload based on an Advanced Encryption Standard (AES) or a Salsa20 Standard. Next, the encrypt engine 103 outputs the encrypted data to the data memory 11.

Moreover, during combining each segment data packet, the encrypt engine 103 further stores each encrypted data to the data memory 11, and then the data memory 11 outputs the segment data packets.

The header processing unit 104 comprises suitable logic, circuitry, interfaces and/or code operable to update checksums of the IP header 20 and the UDP header 21 of each segment data packet stored in the data memory 11. The technique to update the checksums is well known by those of ordinary skill in the art, thus details are not described herein.

The data memory 11, e.g., any kind of storage media, is configured to receive the IP header 20, the UDP header 21, the QUIC public header 22 and at least one encrypted data from the transmission engine 10, and combine the IP header 20, the UDP header 21, the QUIC public header 22 and at least one encrypted data into at least one segment data packet.

Figure 3A:
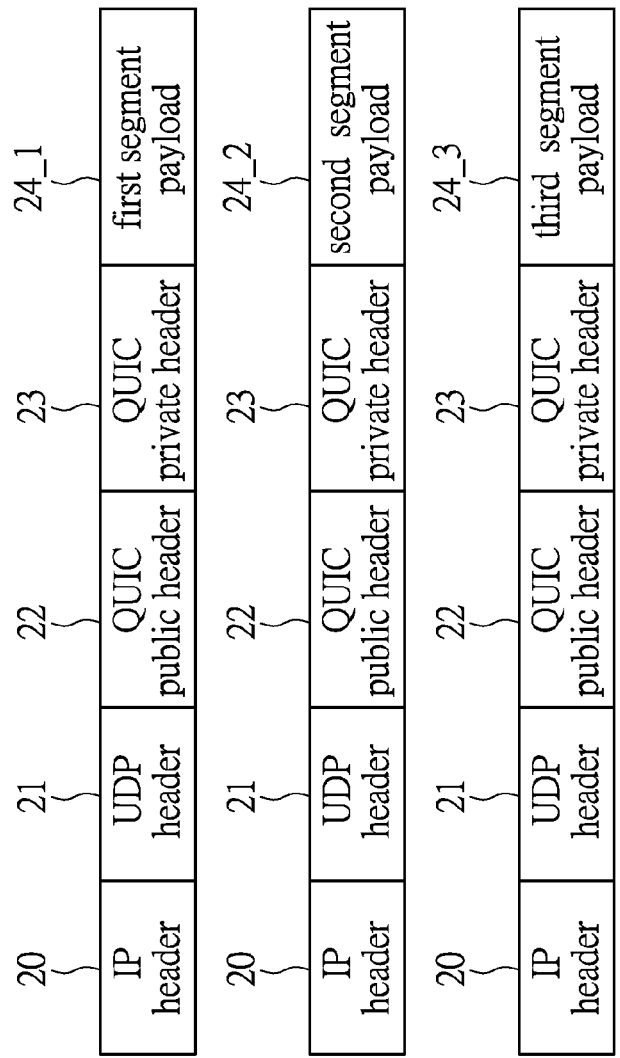
FIG. 3A is a schematic diagram illustrating segment payloads according to an embodiment of the present disclosure.

The following description illustrates how the transmission engine 10 generates the segment data packet. Reference is made to FIGS. 3A-3B and FIGS. 1-2. FIG. 3A is a schematic diagram illustrating segment payloads according to an embodiment. of the present disclosure. FIG. 3B is a schematic diagram illustrating segment data packets according to an embodiment of the present disclosure. After obtaining the data packet from the system memory 2, the header buffer 101 stores the IP header 20, the UDP header 21, the QUIC public header 22 and the QUIC private header 23 of the data packet, and outputs the IP header 20, the UDP header 21 and the QUIC public header 22 to the data memory 11. Simultaneously, the header buffer 101 outputs the QUIC private header 23 to the encrypt engine 103. Notably, the header buffer 101 outputs the IP header 20, the UDP header 21 and the QUIC public header 22 to the data memory 11 based upon a number of the segment payload(s), such that a number of the IP header 20, the UDP header 21 and the QUIC public header 22 stored in the data memory 11 is equal to the number of the segment payload(s).

On the other hand, the segment controller 102 divides the payload 24 to generate at least one segment payload. In the embodiment, the payload 24 is divided into three segment payloads 24_1, 24_2, 24_3 (as shown in FIG. 3A). Next, the segment controller 102 sequentially outputs the segment payloads 24_1, 24_2, 24_3 to the encrypt engine 103.

The encrypt engine 103 receives the QUIC private header 23 and the first segment payload 24_1, and encrypts the QUIC private header 23 and the first segment payload 24_1 into a first encrypted data 25_1. Then, the encrypt engine 103 outputs the first encrypted data 25_1 to the data memory 11.

After receiving the IP header 20, the UDP header 21 and the QUIC public header 22 provided by the header buffer 101 and the first encrypted data 25_1 provided by the encrypt engine 103, the IP header 20, the UDP header 21, the QUIC public header 22 and the first encrypted data 25_1 are combined into a first segment data packet in the data memory 11 shown in FIG. 3B.

The header processing unit 104 updates the checksums of the IP header 20 and the UDP header 21 of the first segment data packet to complete the first segment data packet. Finally, the data memory 11 outputs the first segment data packet to other communication apparatus.

After outputting the first segment data packet, the transmission engine 10 determines whether all of the segment payloads are processed into the segment data packets. Since each of the second segment payload 24_2 and the third segment payload 24_3 has not been combined into the segment data packet, the header buffer 101 again provides the IP header 20, the UDP header 21 and the QUIC public header 22 to the data memory 11, and provides the QUIC private header 23 to the encrypt engine 103.

On the other hand, the segment controller 102 outputs the second segment payload 24_2 to the encrypt engine 103. The encrypt engine 103 encrypts the QUIC private header 23 and the second segment payload 24_2 into a second encrypted data 25_2. Then, the encrypt engine 103 outputs the second encrypted data 25_2 to the data memory 11. The IP header 20, the UDP header 21, the QUIC public header 22 and the second encrypted data 25_2 are combined into a second segment data packet in the data memory 11 shown in FIG. 3B. Finally, the data memory 11 outputs the second segment data packet to other communication apparatus.

Similarly, since the third segment payload 24_3 has not been combined into the segment data packet, the header buffer 101 repeats the above steps to encrypt the QUIC private header 23 and the third segment payload 24_3 into a third encrypted data 25_3. Then, the IP header 20, the UDP header 21 and the QUIC public header 22 provided by the header buffer 101 and the third encrypted data 25_3 are combined into a third segment data packet in the data memory 11. Finally, the data memory 11 outputs the third segment data packet to other communication apparatus.

So far, all of the segment payloads 24_1, 24_2, 24_3 divided from the payload 24 of the data packet are combined into segment data packets. The transmission apparatus 1 obtains a next data packet from the system memory 2, and repeats the above steps to preprocess the next data packet to at least one segment data packet.

The transmission apparatus 1 provided by the embodiment of the present disclosure can assist the system memory 2 to divide and encrypt the data packet for generating at least one segment data packet. A central processing unit (not shown in figures) of the communication apparatus stores the data packet into the system memory 2 rather than dividing or encrypting the data packet. Hence, utilization rate of the central processing unit is decreased. Furthermore, the segment data packet is stored in the data memory 11 of the transmission apparatus 1, and storage capacity in the system memory 2 is not utilized to save the segment data packet.

Notably, in another embodiment, the transmission engine 10 does not include the header processing unit 104. The header processing unit 104 could be configured outside the transmission apparatus 1, and the header processing unit 104 is coupled to the transmission engine 10 and the data memory 11. The header processing unit 104 can update the checksums of the IP header 20 and the UDP header 21 of each segment data packet from the outside of the transmission engine 10 when the segment data packet is combined in the data memory 11.

Or, in another embodiment, the transmission engine 10 does not include the encrypt engine 103 and the header processing unit 104. Both the encrypt engine 103 and the header processing unit 104 are configured outside the transmission apparatus 1. The encrypt engine 103 and the header processing unit 104 are coupled to the transmission engine 10 and the data memory 11. The encrypt engine 103 receives the QUIC private header 23 provided by the header buffer 101 and the segment payload provided by the segment controller 102, and encrypts the QUIC private header 23 and the segment payload into the encrypted data. Next, the encrypt engine 103 outputs the encrypted data to the data memory 11. The IP header 20, the UDP header 21, the QUIC public header 22 and the encrypted data are combined into the segment data packet in the data memory 11. The header processing unit 104 updates the checksums of the IP header 20 and the UDP header 21 of each segment data packet to complete each segment data packet.

Figure 4:
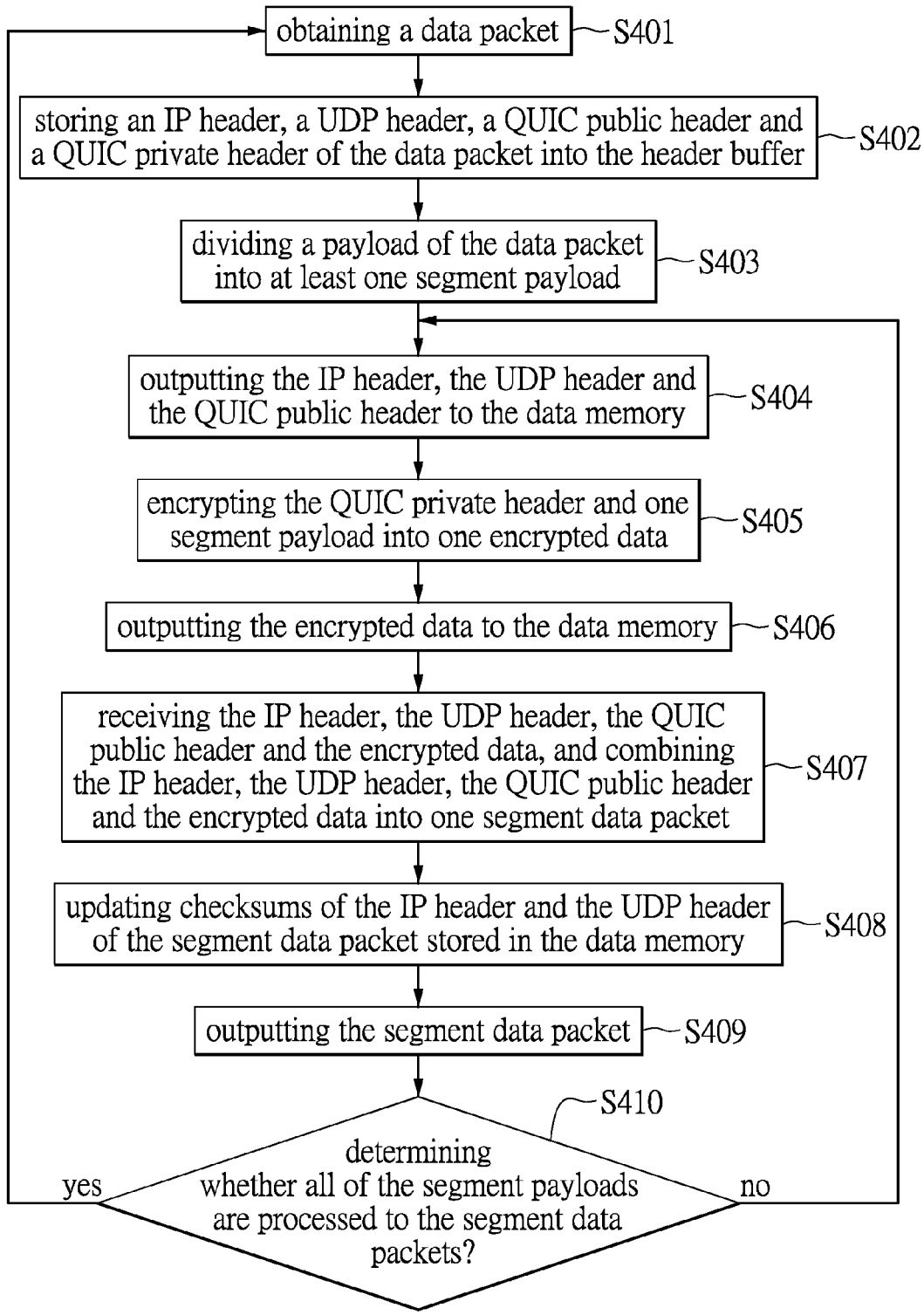
FIG. 4 is a flow chart illustrating a transmission method according to an embodiment of the present disclosure.

Reference is made to FIG. 4. FIG. 4 is a flow chart illustrating a transmission method according to an embodiment of the present disclosure. The transmission method 400 shown in FIG. 4 is adapted for the transmission apparatus 1 shown in FIG. 1. In step S401, the transmission apparatus obtains a data packet from a system memory. In step S402, the transmission apparatus stores an IP header, a UDP header, a QUIC public header and a QUIC private header of the data packet into a header buffer of the transmission apparatus. In step S403, a segment controller of the transmission apparatus divides a payload of the data packet into at least one segment payload.

In step S404, the header buffer outputs the IP header, the UDP header and the QUIC public header to a data memory of the transmission apparatus. Moreover, the header buffer outputs the QUIC private header to an encrypt engine of the transmission apparatus. On the other hand, the segment controller outputs one of the at least one segment payload to the encrypt engine. In step S405, the encrypt engine encrypts the QUIC private header and the one of the at least one segment payload into an encrypted data. In step S406, the encrypt engine outputs the encrypted data to the data memory.

In step S407, the data memory receives the IP header, the UDP header, the QUIC public header and the encrypted data, and the IP header, the UDP header, the QUIC public header and the encrypted data are combined into a segment data packet. In step S408, a header processing unit updates checksums of the IP header and the UDP header of the segment data packet stored in the data memory. In step S409, the data memory outputs the segment data packet to other communication apparatus. In step S410, the transmission apparatus determines whether all of the segment payloads are processed to be the segment data packets. If all of the segment payloads are processed to be the segment data packets, the flow goes to step S401, and the transmission apparatus obtains a next data packet from the system memory. If there is a remaining segment payload which has not been processed to a corresponding segment data packet, the flow goes to S404, and the remaining segment payload is processed to the corresponding segment data packet.

In summary, the transmission apparatus and the transmission method of the present disclosure can divide and encrypt the data packet to generate at least one segment data packet. Workload of the central processing unit of the communication apparatus is reduced by the use of the transmission apparatus of the present disclosure, and then the utilization rate of the central processing unit is decreased.

Since the transmission apparatus includes the header buffer, the system memory is not required to save the headers of the data packets. Furthermore, the segment data packets are stored in the data memory of the transmission apparatus, such that the system memory is not required to save any segment data packet. Hence, the system memory can have more storage capacity to store other information, and the storage capacity of the system memory can be used effectively.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A transmission apparatus, configured to preprocess a data packet stored in a system memory to generate at least one segment data packet, comprising:
 a transmission engine, comprising:
  a header buffer, configured to store an IP header, a UDP header, a QUIC public header and a QUIC private header of the data packet;
  a segment controller, configured to divide a payload of the data packet into at least one segment payload; and
  an encrypt engine, configured to encrypt the QUIC private header and the at least one segment payload into at least one encrypted data; and
 a data memory, configured to receive the IP header, the UDP header, the QUIC public header and the at least one encrypted data, wherein the IP header, the UDP header, the QUIC public header and the at least one encrypted data are combined into the at least one segment data packet.

2. The transmission apparatus according to claim 1, wherein during combining one of the at least one segment data packet, the header buffer is further configured to output the IP header, the UDP header and the QUIC public header to the data memory, such that the IP header, the UDP header and the QUIC public header are combined with one of the at least one encrypted data to generate the one of the at least one segment data packet.

3. The transmission apparatus according to claim 1, wherein the encrypt engine is further configured to store one of the at least one encrypted data to the data memory, such that the IP header, the UDP header and the QUIC public header are combined with the one of the at least one encrypted data to generate one of the at least one segment data packet.

4. The transmission apparatus according to claim 1, wherein the transmission engine further comprises:
 a header processing unit, configured to update checksums of the IP header and the UDP header of one of the at least one segment data packet stored in the data memory.

5. The transmission apparatus according to claim 1, wherein the segment controller divides the payload of the data packet into the at least one segment payload based on a max transmit unit (MTU).

6. A transmission method, adapted for a transmission apparatus, wherein the transmission apparatus comprises a transmission engine and a data memory, the transmission engine comprises a header buffer, and the transmission method comprises:
 step A: obtaining a data packet;
 step B: storing an IP header, a UDP header, a QUIC public header and a QUIC private header of the data packet in the header buffer;
 step C: dividing a payload of the data packet into at least one segment payload;
 step D: encrypting the QUIC private header and the at least one segment payload into at least one encrypted data;
 step E: receiving the IP header, the UDP header, the QUIC public header and the at least one encrypted data by the data memory; and
 step F: combining the IP header, the UDP header, the QUIC public header and the at least one encrypted data into at least one segment data packet.

7. The transmission method according to claim 6, wherein step B further comprises:
 step B-1: during combining one of the at least one segment data packet, outputting the IP header, the UDP header and the QUIC public header to the data memory by the header buffer, such that the IP header, the UDP header and the QUIC public header are combined with one of the at least one encrypted data to generate the one of the at least one segment data packet.

8. The transmission method according to claim 6, wherein step D further comprises:
 step D-1: storing one of the at least one encrypted data to the data memory by an encrypt engine of the transmission engine, such that the IP header, the UDP header and the QUIC public header are combined with the one of the at least one encrypted data to generate one of the at least one segment data packet.

9. The transmission method according to claim 6, wherein the transmission method further comprises:
 step G: updating checksums of the IP header and the UDP header of one of the at least one segment data packet stored in the data memory by a header processing unit of the transmission engine.

10. The transmission method according to claim 6, wherein the transmission method further comprises:
 step H: determining whether all of the at least one segment payload are processed into the at least one segment data packet, when one of the at least one segment payload is not processed into one of the at least one segment data packet, returning to step D for generating the one of the at least one segment data packet.

11. A transmission apparatus, configured to preprocess a data packet stored in a system memory to generate a plurality of segment data packets, comprising:
 a transmission engine, comprising:
  a header buffer, configured to store an IP header, a UDP header, a QUIC public header and a QUIC private header of the data packet;
  a segment controller, configured to divide a payload of the data packet into a plurality of segment payloads; and
  an encrypt engine, configured to encrypt the QUIC private header and the segment payloads into a plurality of encrypted data; and
 a data memory, configured to receive the IP header, the UDP header, the QUIC public header and each of the encrypted data, wherein the IP header, the UDP header, the QUIC public header and the encrypted data are combined into the segment data packets.

12. The transmission apparatus according to claim 11, wherein during combining one of the segment data packets, the header buffer is further configured to output the IP header, the UDP header and the QUIC public header to the data memory, such that the IP header, the UDP header and the QUIC public header are combined with one of the encrypted data to generate the one of the segment data packets.

13. The transmission apparatus according to claim 11, wherein the encrypt engine is further configured to store one of the encrypted data to the data memory, such that the IP header, the UDP header and the QUIC public header are combined with one of the encrypted data to generate one of the segment data packets.

14. The transmission apparatus according to claim 11, wherein the transmission engine further comprises:
   a header processing unit, configured to update checksums of the IP header and the UDP header of one of the segment data packets stored in the data memory.

15. The transmission apparatus according to claim 11, wherein the segment controller divides the payload of the data packet into the segment payloads based on a max transmit unit (MTU).

* * * * *